Patented Mar. 31, 1925.

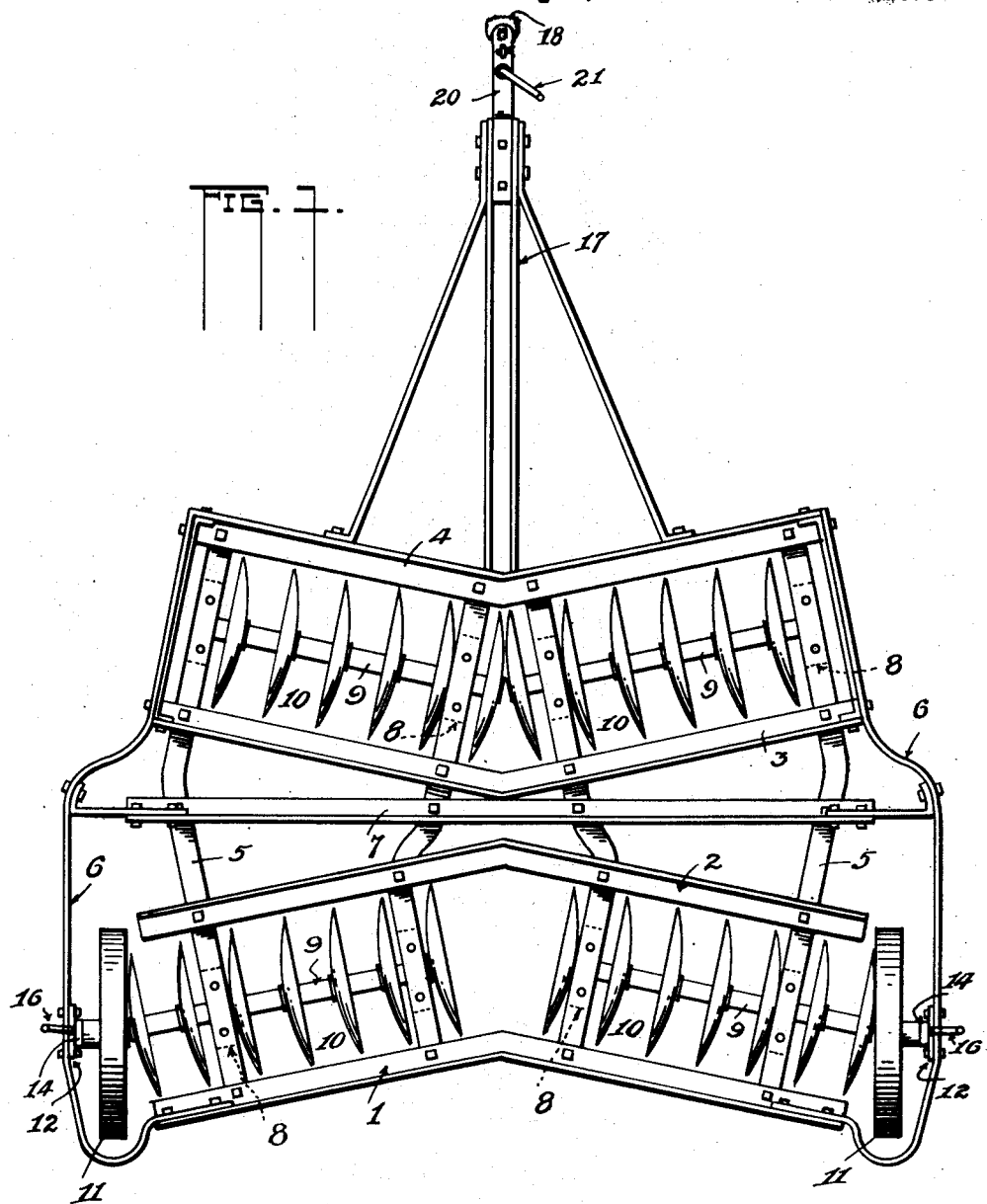

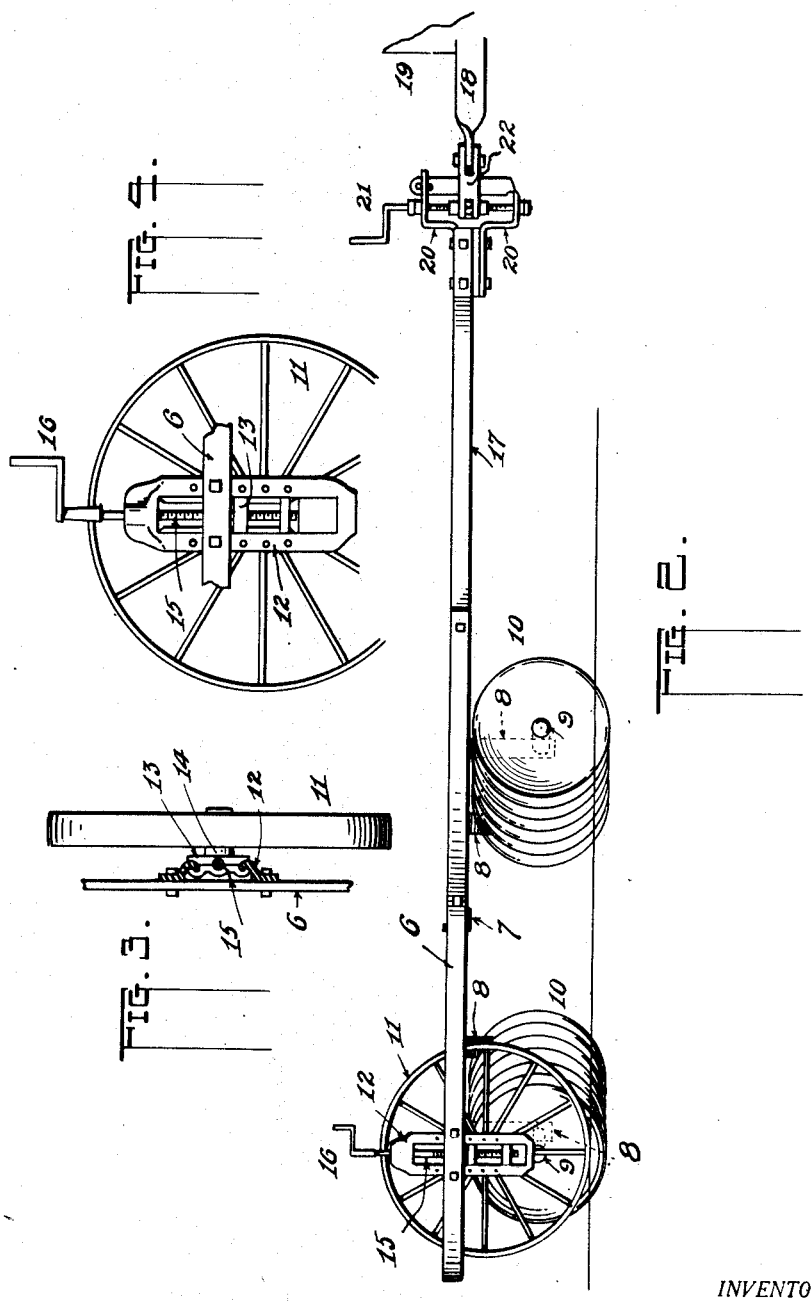

1,531,278

UNITED STATES PATENT OFFICE.

JOHN H. FLATLEY, OF LITTLE YORK, ILLINOIS, ASSIGNOR TO BROWN LYNCH SCOTT CO., OF MONMOUTH, ILLINOIS, A CORPORATION OF ILLINOIS.

DISK HARROW.

Application filed August 7, 1922. Serial No. 580,060.

*To all whom it may concern:*

Be it known that I, JOHN H. FLATLEY, a citizen of the United States, residing at Little York, in the county of Warren and State of Illinois, have invented new and useful Improvements in Disk Harrows; and I do hereby declare that the following is a full, clear, and exact description of the invention, which will enable others skilled in the art to which it appertains to make and use the same.

My invention has reference to wheeled disk harrows, pertaining more particularly to a single rigid frame harrow, including four disk gangs, adapted for use in connection with tractors.

Specifically, my invention includes a single rigid frame, under which four disk sections or gangs are mounted in such fixed position as is necessary to enable the several disk blades to do the most efficient work in the soil; in recognition of the fact that, obviously, there is only one certain position in which a disk blade will work most efficiently, just as there is only one certain position in which the moldboard of a plow will work most efficiently.

The moldboard of a plow is held in a certain fixed position relative to the soil, with provision so that the operator may cause it to run deeper or shallower according to the condition of the soil and results desired. I apply the same principle to the four gangs of disks.

In disk harrows as ordinarily used, where two separate frames are pivotally connected, each of which has two sections or gangs of disks flexibly attached to it, with means for changing the angle of the gangs, the desired penetration of the soil cannot be secured since no control is had of the separate frames, and two times out of three the blades are set at too great an angle, or at too slight an angle to work most efficiently, having a tendency in one case to ridge the soil, and in the other to secure but slight results in soil treatment.

Distinguishing from this I employ a single rigid frame to which all four of the disk sections are rigidly attached in permanent position at the proper angle, the harrow including depth-regulating wheels, as I term them, whereby any desired penetration of the soil is secured, with the several blades working in the one certain position necessary to work most efficiently, the front end of the frame being attached to and supported by a tractor. Since all of the several blades are held rigidly in fixed position under the single rigid frame the entire weight of the machine is placed upon them, and said weight is brought to bear, on occasion, on any high places in the soil, to completely level them, and when working in soil where corn was grown the previous year the stalks thereof will be cut into short pieces making far cleaner work far superior to that afforded by the ordinary type of jointed disk harrow mentioned.

An object of my invention, therefore, is to mount a single rigid harrow frame above four disk gangs or sections, supporting said frame at one end on the draw-bar of a tractor and mounting the other end upon depth-regulating wheels in such manner that said frame may be adjusted vertically with respect to said wheels, and that both pairs of disk gangs may be maintained at any desired depth for which they may be set to operate, whether working upon even or uneven ground.

Another object is to so dispose the depth-regulating wheels of a harrow that the said pairs of disk gangs will operate at desired depths.

My harrow, as constructed and arranged, when drawn and supported at its front end by a tractor yields results long desired. That is to say, the tractor draw-bar for the front support of the rigid single frame, and the two depth-regulating wheels, one on each side at the rear of the frame, constitute a three-point suspension for the pairs of disk gangs so that said gangs when set for a desired depth of penetration will be maintained at that depth. In explanation of this, it is to be understood that since the depth-regulating wheels carry the rear end of the frame, and since the front end of the frame is maintained substantially at a fixed distance above the ground by the tractor draw-bar, the depth of cut must be practically uniform.

The front gangs, which would naturally tend to ride over obstructions, are held down positively by the connection with the tractor and are made to cut through such obstructions. Also the front gangs are prevented from nosing into the ground, as the rear gangs rise over obstructions, by holding the front end of the frame at substantially a fixed height upon the tractor draw-bar.

In addition to the described advantages of my form of harrow the entire machine may be moved backward by the tractor when desired to clear the gangs of masses of clods which sometimes accumulate. The ability to thus back the machine is a very great advantage when desiring to get out of low miry places, a thing entirely impossible when using a harrow of the two-frame jointed type.

A selected embodiment of the invention adapted to accomplish the above results is shown in the accompanying drawings, it being understood that equivalent structures may be used.

Figure 1 is a plan of a disk harrow showing my invention.

Figure 2 is a side elevation of the same.

Figure 3 is a detailed plan view of a carrying wheel and its mounting and showing parts in horizontal section, and Figure 4 is a side elevation of a carrying wheel and mounting.

In said figures, 1 and 2 are two rear frame members preferably of angle-iron bent at their middles to carry their extremities somewhat rearward of said bends. Similarly formed forward frame members are represented at 3 and 4, their extremities being carried ahead of their middles or bends, and thus having position opposite those of the rear members described.

Connected to and extending across the several frame members are tie beams 5 disposed longitudinally of the machine, bracing all of the members rigidly. In addition, a bar 6 at each side of the machine extends from front to rear and is connected to the several members 1, 2, 3, 4, while a central transverse bar 7 bolted across the beams 5 is rigidly connected to said bars; but while I prefer to use this form of structure to create a very staunch type of frame, it is understood that others may be used instead.

Extending from the under sides of the members 5, for example, are bearings 8 which carry the shafts 9 of disk gangs 10 of which there are a pair of forward ones and a pair of rear ones, the shafts of the several gangs being independent of one another. The two forward shafts form a wide spreading V, while the rear ones form a wide spreading A as viewed in Fig. 1.

A depth regulating wheel is placed at each side of the machine frame at the rear thereof and just outside the outer disk of each rear gang. One of the mountings for the wheels is clearly illustrated in Figures 3 and 4, wherein 12 is an open guide-frame or yoke bolted rigidly to the side bar 6. Within the guide frame is a cross-head 13 carrying a stub-axle 14 upon which the wheel is mounted. Extending vertically through said cross-head is a thread-bar 15 which may be operated by a crank 16, for example, by which vertical adjustments of the frame with respect to the wheel can be made. The wheels support the frame and constitute means for regulating the depth of cut of the disks.

I have found it necessary to so mount the wheels that they will have no bodily movement in the direction of travel of the machine, i. e., forwardly or rearwardly with respect to the disk gangs, and yet enable the operator to adjust the frame vertically upon them. Therefore there is provided any such arrangement as is shown in Figures 3 and 4, in order that vertical adjustment of the frame and the disk gangs may be made without change in the position of said wheels forwardly or rearwarly, it being expressly understood that any arrangement for such adjustment, other than that shown, may be used.

That the pairs of gangs, now, shall cut to the desired depth, and that they will also be free of up and down motion, the tongue or reach 17 is maintained at substantially a fixed distance from the ground by attaching it to the draw-bar 18 of a tractor 19, part of which is shown in Figure 2.

The frame of the harrow and its tongue or reach are rigidly related and the connection of the latter with the draw-bar 18 is a pivotal one. The said tongue or reach is maintained at a constant height by this draw-bar construction, but in order that the front gang shall work at a desired depth a vertical adjustment of the reach with respect to the draw-bar is made possible through any desired mechanism readily operable from the tractor without the operator being required to dismount, and the adjustment is thus preferably made while the outfit is in motion.

The adjustment mechanism may be of any preferred type and, as an example thereof, I have shown a yoke composed of spaced arms 20 fixed relatively to the reach 17 in which yoke a thread-bar 21 has its bearings, there being a bar 22 lying between the arms having a part threaded to engage said thread-bar. The said bar 22 is so held on the latter as to be maintained rigidly at right angles thereto, and, being supported by the draw-bar the rotation of said thread-bar will cause the yoke 20 with the reach 17 to be raised or lowered.

This method enables the operator to gauge the depth of cut of the front gangs and to maintain the latter at any desired position with respect to the rear ones while the tractor is in motion.

Furthermore, upon encountering wet soil, the front gangs can be quickly raised and cleared of the ground by means of the front lift without stopping the tractor, permitting the rear gangs to operate alone. With regard to the adjustment of the harrow-frame on the depth-regulating wheels 11 it may be stated that, as distinguished from older types used to obtain this adjustment, the wheels have no forward movement and hence are never placed where they will pass over soil thrown out by the front disks.

My invention, then, contemplates the use of depth regulating wheels each located permanently in close proximity to the rear disk-gangs, just outside the soil thrown out by the outermost disk of the front pair of gangs, adjusting the frame on a vertical line passing through said wheels, and adjusting vertically the front end of the frame with respect to a tractor draw-bar to which it is attached by means that can be operated without stopping the harrowing operation to the end that the two pairs of disk-gangs can be readily gauged for the same depth of penetration, or separately adjusted for unequal penetration.

A frame rigid throughout and supported at the rear, and supported at the front on a tractor, prevents teetering of the harrow, and therefore any adjustments for depth of cut of the disk-gangs will always be maintained under all conditions of soil.

I claim:

1. In a harrow, the combination of a rigid frame, two front disk gangs mounted in the frame in angular relation to throw the dirt outwardly, two rear disk gangs mounted in the frame in angular relation to throw the dirt inwardly, a pair of carrying wheels mounted on the frame, a reach projecting forwardly from the frame and rigidly connected therewith, means for attaching the front end of the reach to a tractor, said means permitting lateral movement but preventing vertical movement of the harrow relative to the tractor, and means on the reach for adjusting the forward part of the frame vertically to regulate the depth of operation of the forward gangs.

2. In a harrow, the combination of a rigid frame, two front disk gangs mounted in the frame in angular relation to throw the dirt outwardly, two rear disk gangs mounted in the frame in angular relation to throw the dirt inwardly, a pair of carrying wheels mounted on the frame behind the front gangs, means for adjusting the frame vertically on the wheels to regulate the depth of operation of all the gangs, a reach projecting forwardly from the frame and rigidly connected therewith, means for attaching the front end of the reach to a tractor, said means permitting lateral movement but preventing vertical movement of the harrow relative to the tractor, and means on the reach for adjusting the forward part of the frame vertically to regulate the depth of operation of the forward gangs.

3. In a harrow, the combination of a rigid frame, two front disk gangs mounted in the frame in angular relation to throw the dirt outwardly, two rear disk gangs mounted in the frame in angular relation to throw the dirt inwardly, a pair of carrying wheels mounted on the frame behind the front gangs, means for adjusting the frame vertically on the wheels to regulate the depth of operation of all the gangs and adapted in any adjustment to move the rear gangs more than the front gangs, a reach projecting forwardly from the frame and rigidly connected therewith, means for attaching the front end of the reach to a tractor, said means permitting lateral movement but preventing vertical movement of the harrow relative to the tractor, and means on the reach at the forward end thereof for adjusting the forward part of the frame vertically to regulate the depth of operation of the forward gangs without affecting the adjustment of the rear gangs.

4. In a harrow, the combination of a rigid frame, a reach projecting forwardly from the frame and rigidly connected therewith, means for attaching the front end of the reach to a tractor, said means permitting lateral movement but preventing vertical movement of the harrow relative to the tractor, two front disk gangs fixedly mounted in the frame in angular relation to throw the dirt outwardly, two rear disk gangs fixedly mounted in the frame in angular relation to throw the dirt inwardly, a pair of carrying wheels mounted at the sides of the frame opposite the rear gangs, means for adjusting the frame vertically on each of the wheels to regulate the depth of operation of all of the gangs and adapted in any adjustment to move the rear gangs more than the front gangs, and means on the reach at the forward end thereof for adjusting the forward part of the frame vertically to regulate the depth of operation of the forward gangs.

In testimony whereof I affix my signature in presence of two witnesses.

JOHN H. FLATLEY.

Witnesses:
J. A. SCOTT,
A. H. DAY.